United States Patent Office 3,393,202
Patented July 16, 1968

3,393,202
2,3-DIHYDRO-5-CARBOXAMIDO-6-METHYL-1,4-OXATHIINS AND METHOD OF MAKING SAME
Marshall Kulka, Dalel S. Thiara, and William A. Harrison, Guelph, Ontario, Canada, assignors to Uniroyal, Inc., a corporation of New Jersey
No Drawing. Filed Apr. 26, 1965, Ser. No. 451,048
19 Claims. (Cl. 260—327)

ABSTRACT OF THE DISCLOSURE 2,3-dihydro-5-carboxamido-6-methyl-1,4-oxathiins are prepared by mixing an alpha-chloro-N-substituted acetoacetamide (e.g., alpha-chloroacetoacetanilide) with 2-mercaptoethanol under basic conditions; upon subjecting to acidic conditions cyclization occurs with loss of water to form the desired product. In an alternative method, the starting chemical is an alkyl alpha-chloroacetoacetate which forms a cyclic ester; conversion to the acid chloride and reaction with an amine forms the desired product. The nitrogen atom of the carboxamido group may be substituted with various hydrocarbons (e.g., alkyl, aryl, etc.) or equivalent substituted hydrocarbons (e.g., methoxyphenyl, chlorophenyl, etc.). The chemicals are useful as fungicides and bactericides.

---

This invention relates to new chemicals and to methods of preparing same, more particularly 2,3-dihydro-5-carboxamido-6-methyl-1,4-oxathiins(I) and methods of making them.

The chemicals of the invention may be represented by the formula

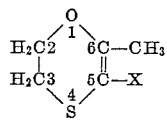

wherein X is a carboxamido group. The nitrogen atom of the carboxamido group may be primary, secondary or tertiary, that is, the carboxamido group consists of an amino group attached to a carbonyl group (in turn attached to the carbon atom in the 5 position of the oxathiin ring as shown), which amino group may be primary, secondary or tertiary, as will be exemplified in detail below.

The chemicals of the invention are adapted to various uses. Thus, they are not only useful as intermediates for the synthesis of other chemicals, but they may themselves be put to practical use as fungicides, bactericides, and other uses.

Two methods for the preparation of this new class of compounds (I) have been discovered.

The first method, represented by the following equations, involves providing the appropriate known alpha-chloroacetoacetamide (III) (which may in turn be prepared in accordance with conventional practice, for example, by chlorination of the acetoacetamide (II) with sulfuryl chloride in benzene), and then reacting (III) with 2-mercaptoethanol (IV) under basic conditions. (It will be understood that alpha-bromo-acetoacetamide may be used instead.) The reaction proceeds through two intermediates V and VI, neither of which need be isolated:

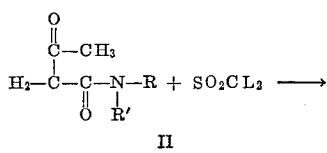

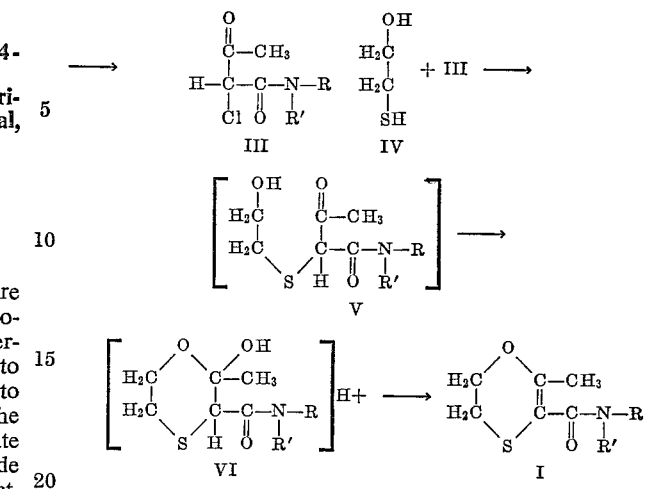

The reaction between III and IV, in the presence of a base, whether an inorganic base (e.g. alkali metal hydroxide, carbonate or bicarbonate) or an organic base (e.g. pyridine or N,N-dimethylaniline), proceeds readily at ambient temperatures. The reaction is conveniently carried out in any solvent medium that is inert under the conditions of the reaction, such as water, alcohol (e.g., methanol, ethanol, butanol, propanol etc.) or other organic solvent, for example, a hydrocarbon solvent such as benzene or hexane, ether, acetone, pyridine, dioxane, etc., or a mixture of such solvents. Preferably a volatile solvent is used to facilitate recovery of the product. The reaction is exothermic, and in order to prevent an undue rise in temperature one of the reactants (conveniently in solution) may be added gradually to the other (preferably in solution). External cooling may be applied if necessary, but in any case it is not necessary to maintain any particular critical temperature range. The materials may be reacted in equimolar quantities or an excess of one of the reactants may be employed if desired. When the base employed is potassium hydroxide, potassium chloride is formed during the reaction; this precipitates (when water is not the solvent) and can be filtered off. The reaction mixture at this stage contains the intermediate V or VI or both. Although the intermediates can be recovered by evaporating the solvent, this is not necessary. The intermediate V cyclizes readily to VI under slightly acidic conditions. The intermediate VI is readily dehydrated to yield the product I. This is conveniently accomplished by acidification of the solution, for example with a small quantity of organic acid (e.g., para-toluene-sulfonic acid, benzene-sulfonic acid, p-chlorobenzenesulfonic etc.) or inorganic acid (e.g., hydrochloric acid). The dehydration is facilitated by heating, and particularly by heating under reflux conditions to drive off the water formed, conveniently as an azeotrope with benzene or the like from which the water can be separated before returning the reflux. Many possible variations in the procedure will be apparent to those skilled in the art.

Alternatively the synthesis may be carried out in one pot. After the chlorination is complete, the HCl and $SO_2$ are blown out with air and then the resulting suspension or solution of the alpha-chloroacetoacetamide (III) in benzene is directly treated with 2-mercaptoethanol as above.

The second method of the invention for the preparation of the new compound I involves ring formation first and then the amide function adjustment, as represented in the equations below. An alkyl acetoacetate such as ethyl acetoacetate (VII) (or equivalent, such as any lower alkyl [1–4 C atoms] acetoacetate) is chlorinated with sulfuryl chloride to form the known ethyl alpha-chloroacetoacetate (VIII). (It will be understood that other halogens, e.g., bromine, are also suitable.) The ethyl alpha-chloroacetoacetate (VIII) is treated with 2-mercaptoethanol (IV) in the presence of a base in a manner analogous to the first method described above, causing the formation of two intermediates IX and X, which need not be isolated. Instead the intermediates are cyclized and dehydrated by the action of acid as in the first method, conveniently by heating under reflux in a benzene solution thus removing the water azeotropically to give (XI). This ester (XI) is then hydrolyzed to 2,3-dihydro-6-methyl-1,4-oxathiin-5-carboxylic acid (XII) by boiling a short time with aqueous alkali. The acid XII is converted to the acid chloride XIII by means of thionyl chloride (or equivalent halogenating agent), and the amide I is then obtained from XIII by adding an amine. The acid chloride XIII will react with any primary or secondary amine (including hydrazine or ammonia) without limitation to form the amide I. For each mole of acid chloride XIII, two moles of amine react, one of which acts as the hydrogen chloride acceptor and the other of which forms the amide. However, if desired one mole of the amine may be employed together with one mole of inorganic base or organic tertiary base, with equally good results.

The first method which is the more direct method is more sensitive to side reactions and the yields of I obtained by such method may be lower. The first method is particularly well suited to those cases in which at least one of R and R' is hydrogen. The second method is preferred for those cases in which both R and R' are hydrocarbons (or substituted hydrocarbons), especially alkyl.

Equations representing the second method are as follows:

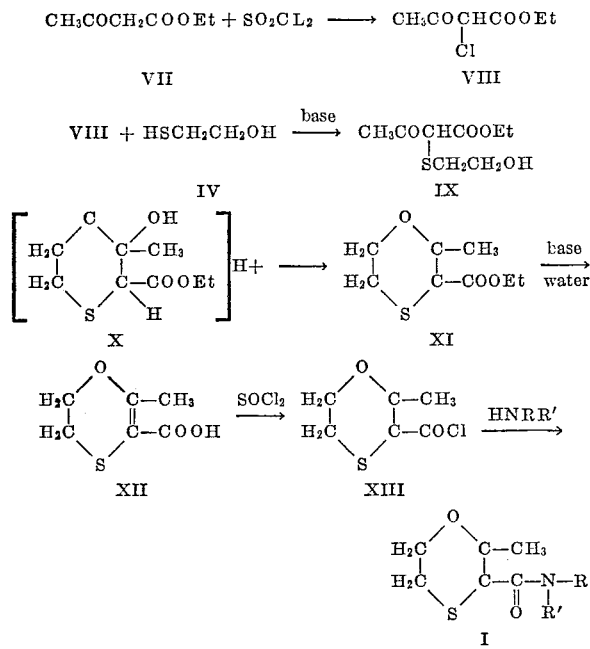

In the above equations R and R' represent hydrogen, $NH_2$, or various univalent organic groups, whether a hydrocarbon group or an equivalent substituted hydrocarbon group. As specific new chemicals of the type I there may be mentioned by way of non-limiting example such compounds as 2,3-dihydro-5-carboxamido-6-methyl-1,4-oxathiin;
2,3-dihydro-5-N-aminocarboxamido-6-methyl-1,4-oxathiin;
2,3-dihydro-5-N-methylcarboxamido-6-methyl-1,4-oxathiin;
2,3-dihydro-5-N,N-dimethylcarboxamido-6-methyl-1,4-oxathiin;
2,3-dihydro-5-N-isopropylcarboxamido-6-methyl-1,4-oxathiin;
2,3-dihydro-5-N,N-diisopropylcarboxamido-6-methyl-1,4-oxathiin;
2,3-dihydro-5-N-n-butylcarboxamido-6-methyl-1,4-oxathiin;
2,3-dihydro-5-N-dodecyl-carboxamido-6-methyl-1,4-oxathiin;
2,3-dihydro-5-N,N-didodecylcarboxamido-6-methyl-1,4-oxathiin;
2,3-dihydro-5-N-methyl-N-ethylcarboxamido-6-methyl-1,4-oxathiin;
2,3-dihydro-5-N-phenylcarboxamido (also called 5-carboxanilido)-6-methyl-1,4-oxathiin;
2,3-dihydro-5-N-methyl-N-phenylcarboxamido-6-methyl-1,4-oxathiin;
2,3-dihydro-5-N-alpha-naphthylcarboxamido-6-methyl-1,4-oxathiin;
2,3-dihydro-5-N-p-biphenylcarboxamido (also called 5-p-phenyl-carboxanilido)-6-methyl-1,4-oxathiin;
2,3-dihydro-5-N-beta-naphthylcarboxamido-6-methyl-1,4-oxathiin;
2,3-dihydro-5-N,N-di-beta-naphthylcarboxamido-6-methyl-1,4-oxathiin;
2,3-dihydro-5-N-o-biphenylcarboxamido (also called 5-o-phenylcarboxanilido)-6-methyl-1,4-oxathiin;
2,3-dihydro-5-N-ethyl-N-o-biphenylcarboxamido-6-methyl-1,4-oxathiin;
2,3-dihydro-5-N-o-methylphenylcarboxamido-6-methyl-1,4-oxathiin;
2,3-dihydro-5-N,N-dibutylcarboxamido-6-methyl-1,4-oxathiin;
2,3-dihydro-5-N-dibutylphenylcarboxamido-6-methyl-1,4-oxathiin;
2,3-dihydro-5-N-benzylcarboxamido-6-methyl-1,4-oxathiin;
2,3-dihydro-5-N-alpha-phenylethylcarboxamido-6-methyl-1,4-oxathiin;
2,3-dihydro-5-N-cyclopentylcarboxamido-6-methyl-1,4-oxathiin;
2,3-dihydro-5-N-cyclohexyl-carboxamido-6-methyl-1,4-oxathiin;
2,3-dihydro-5-N-cyclooctylcarboxamido-6-methyl-1,4-oxathiin;
2,3-dihydro-5-N-allylcarboxamido-6-methyl-1,4-oxathiin;
2,3-dihydro-5-N,N-diallylcarboxamido-6-methyl-1,4-oxathiin;
2,3-dihydro-5-N-methallylcarboxamido-6-methyl-1,4-oxathiin;
2,3-dihydro-5-N-ethallylcarboxamido-6-methyl-1,4-oxathiin, and the like.

From the foregoing it will be apparent that R and R' may be any hydrocarbon group, whether straight chain, branched, or cyclic, whether saturated or unsaturated (aromatic unsaturation or non-benzenoid unsaturation) that is, aliphatic, cycloaliphatic and aromatic, including ethylenically unsaturated groups, among which may be mentioned such important groups as alkyl, aryl, aralkyl, alkaryl, cycloalkyl, alkenyl, and various combinations thereof. Equivalent to the hydrocarbon groups are the various substituted hydrocarbons, notably those substituted with halogens (e.g., chlorine, bromine), nitro, carboxyl, ether, ester, or similar groups, singly or as muti-substituents (e.g., R and/or R'=2,5-dichlorophenyl; 3,4-dichlorophenyl; 2-methyl-3,5-dichlorophenyl; 2,4,6-trimethylphenyl; 2,4,6-trichlorophenyl), as will be exemplified in more detail below. Likewise the substitution may be in a carbon chain, for example in a ring to provide a heterocyclic ring, containing one or more of such hetero atoms as nitrogen, oxygen, and sulfur, as will be exemplified below. Thus, there may be mentioned such N-heterocyclic substituted products as those in which R'=furfuryl, alpha-pyridyl, benzothiazolyl, etc. Interesting forms of the invention may be provided by joining R and R' together to form a ring structure, e.g., a morpholido group. If desired R and/or R' may serve as linkages to another 2,3-dihydro-5-carboxamido-6-methyl-1,4-oxathiin radical to form a bis compound. These embodiments are of course not exhaustive, and many other variations will be apparent to those skilled in the art.

Preferred chemicals of the invention are those in which R' is hydrogen and R has one of the other values stated, particularly alkyl (especially butyl), aryl (especially phenyl), alkaryl (especially tolyl, particularly o-tolyl and m-tolyl), or cycloalkyl (especially cyclohexyl), or similar hydrocarbon group having up to 12 carbon atoms.

The following examples will serve to illustrate the practice of the invention in more detail.

EXAMPLE I 2,3-dihydro-5-carboxanilido-6-methyl-1,5-oxathiin
(I, R=C$_6$H$_5$, R'=H)

METHOD 1.—FROM ACETOACETANILIDE

Step I.—Preparation of alpha-chloro-acetoacetanilide (III, R=C$_6$H$_5$, R'=H). To a stirred suspension of acetoacetanilide (150 g., 0.845 mole) and dry benzene (one liter) was added sulphuryl chloride (72 ml. or 120 g., 0.890 mole) dropwise over a period of 1½ hours. The stirring was continued for ½ hour or more. The product was filtered (the filtrate used in a second run in place of dry benzene gave a higher yield of alpha-chloroacetoacetanilide); washed with water and benzene and dried. Yield 131 g. (73.5%); M.P. 136–138° C. [Naik, Trivedi and Mankad, J. Indian Chem. Soc., 20, 365 (1943); Bulow and King, Ann. 439, 211 (1924)].

Step II.—Preparation of 2,3-dihydro-5-carboxanilido-6-methyl-1,5-oxathiin (I, R=C$_6$H$_5$, R'=H). To a stirred suspension of alpha-chloroacetoacetanilide (63.5 g. or 0.3 mole) and dry benzene (300 ml.) was added a solution of KOH (20.4 g.), 2-mercaptoethanol (22.2 ml. or 22.5 g., 0.3 mole) and methanol (40 ml.) dropwise over a period of two hours, keeping the temperature below 30° C. The mixture was stirred for one hour more. The potassium chloride which precipitated was filtered. The solvents were removed from the filtrate by distillation. Benzene was added to the residue and then washed with water until neutral. The benzene solution was acidified with p-toluenesulfonic acid (0.8 g.) and heated under reflux using a Dean-Stark trap to collect water. The water collected was 5 ml. (theory 5.3 ml.). The solution was washed with water and the benzene removed. The residue solidified and was crystallized from 95% ethanol. Yield 45.8 g. (65%); M.P. 93–95° C.

METHOD 1A.—USING SODIUM BICARBONATE

To a stirred suspension of alpha-chloracetoacetanilide (42.3 g. or 0.2 mole) in benzene (200 ml.) and 2-mercaptoethanol (17 g.) was added a solution of sodium bicarbonate (22 g.) in water (150 ml.) portionwise in one hour. The reaction mixture was further stirred until all the solids went into solution (½ hour). The benzene layer was separated, washed with water, acidified with p-toluenesulfonic acid (0.5 g) and then heated under reflux removing the water (3.5 cc.) formed by azeotropic distillation using a Dean-Stark trap. The reaction mixture was cooled, washed with water and the solvent removed. The residue was crystallized from methanol. Yield 27 g.; M.P. 93–94° C.

The mother liquors were taken to dryness but the viscous oily residue would not crystallize. This was dissolved in benzene, washed with aqueous sodium hydroxide and with water and the benzene removed. The residue solidified quickly and crystallized from methanol. Yield 8.5 g.; M.P. 92–93° C.; total yield 35.5 g. (75%).

METHOD 2.—FROM ETHYL ACETOACETATE (VII).

Step I.—Preparation of ethyl-alpha-chloroacetoacetate (VIII). [1. Allihn, Ber., 11, 567 (1878). 2. Boehme, W. R. Org. Syn. vol. 33, 43 (1953).] To a stirred and cooled solution of ethyl acetoacetate (260 g. or 2 moles) was added sulphuryl chloride (270 g. or 2 moles) over 3 hours, keeping the temperature between 0° and 5° C. The reaction mixture was left overnight. The SO$_2$ and HCl were removed on a water pump. The residual dark liquid was distilled at reduced pressure. After a small fore-run the liquid distilling between 88–90° C. (at 16 mm.) was collected. Yield 300 g. (91%).

Step II.—Preparation of ethyl 2,3-dihydro-6-methyl-1,4-oxathiin-5-carboxylate (XI). To a cooled and stirred solution of ethyl alpha-chloroacetoacetate (33 g. or 0.2 mole) and dry benzene (200 ml.) was added a solution of potassium hydroxide (13.6 g.); 2-mercaptoethanol (15.0 ml. or 15.6 g.) and methanol (30 ml.) over a period of 1½ hours keeping the temperature below 30° C. The reaction mixture was stirred for ½ hour more. The potassium chloride formed was filtered. The solvents were removed from the filtrate. Benzene was added to the residue and then washed with water. The benzene solution was acidified with p-toluene-sulfonic acid and the water (3.4 ml.; theory 3.6 ml.) was collected by azeotropic distillation using the Dean-Stark trap. The reaction mixture was cooled, washed with water and then the benzene removed. The residue was distilled under high vacuum; B.P. (1 mm.) 107–110° C.; yield 23 g. (61.2%). This compound was also prepared using sodium bicarbonate as in Method 1A instead of potassium hydroxide. The yield was 76%.

Step III.—Preparation of 2,3 - dihydro - 5 - carboxy-6-methyl-1,4-oxathiin (XII). To a solution of ethyl 2,3-dihydro-6-methyl-1,4-oxathiin-5- carboxylate (188 g.) in 95% ethanol (50 ml.) was added a solution of NaOH (60 g.) in water (400 ml.). The reaction mixture was heated under reflux until the two layers became homogeneous (about one-half hour).

The solution was cooled, diluted with water and acidified with dilute HCl. The white solid which precipitated was filtered *at once,* washed with water and dried in air. Yield 134 g. (84%); M.P. 178–180° C. Recrystallized material from ethanol melts at 180–181° C.

Step IV.—Preparation of 2,3-dihydro-5-carboxanilido-6-methyl-1,4-oxathiin (I, R=C$_6$H$_5$, R'=H). To a suspension of 2,3-dihydro-5-carboxy-6-methyl-1,4-oxathiin XII (32 g. or 0.2 mole) in chloroform (200 ml.) was added thionylchloride (16 ml.) and the solution was heated under reflux. Hydrogen chloride and sulfur dioxide were evolved and all the solids went into solution in two hours. The excess thionylchloride and solvent were removed in vacuo. To the residue (XIII) dissolved in chloroform (or benzene) was added a solution of aniline (37.2 g.) in chloroform (or benzene), portionwise. The aniline hydrochloride which formed was filtered. The filtrate was washed with very dilute HCl solution and then with water. The chloroform (or benzene) was removed and the residue solidified at once. It was recrystallized from 95% ethanol. Yield 38 g. (80%); M.P. 93–94° C.

EXAMPLE 2

2,3-dihydro-5-carboxymorpholido-6-methyl-1,4-oxathiin

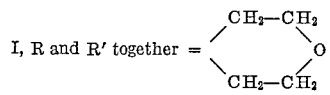

This was prepared in 30% yield from 2,3-dihydro-6-methyl-1,4-oxathiin - 5 - carboxylic acid chloride (XIII) and morpholine by Method 2. Boiling Point (2–3 mm.) 170° C.

EXAMPLE 3

N,N'-alpha, beta-ethylene bis(2,3-dihydro-5-carboxamido-6-methyl-1,4-oxathiin)

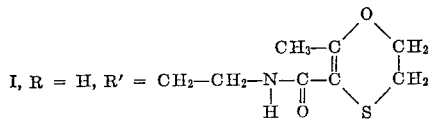

This was prepared in 40% yield from 2,3-dihydro-6-methyl-1,4-oxathiin-5-carboxylic acid chloride (XIII) and ethylene diamine by Method 2. M.P. 168° C.

EXAMPLE 4

2,3-dihydro-5-p-carboxycarboxanilido-6-methyl-1,4-oxathiin

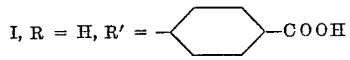

A solution of thionyl chloride (26 g. 0.22 mole) in chloroform (50 ml.) was added to 6-methyl-5-carboxy-2,3-dihydro-1,4-oxathiin (XII) (32 g., 0.20 mole) suspended in chloroform (75 ml.) and the mixture heated under reflux until the suspended solid dissolved (1–3 hours). The solution was then evaporated under reduced pressure to remove solvent, unreacted thionyl chloride and the hydrogen chloride and sulphur dioxide produced in the reaction. The residual crude 2,3-dihydro-6-methyl-1,4-oxathiin-5-carboxylic acid chloride (XIII), was dissolved in benzene (100 ml.) and added to p-aminobenzoic acid (120 g., 0.88 mole) partially dissolved in a mixture of benzene (300 ml.) and chloroform (200 ml.). Since there was initially no apparent reaction, the reaction mixture was warmed on a steam cone for one hour, allowed to stand at room temperature for two days and then heated for a further two hours. Dilute hydrochloric acid was added to the reaction mixture and the insoluble material collected by filtration. The solid was treated with aqueous sodium bicarbonate and the bicarbonate-insoluble material removed by filtration. Acidification of the filtrate with dilute hydrochloric acid and recrystallization of the resulting precipitate from ethanol yielded 2,3- dihydro - 5 - N - p - carboxycarboxanilido - 6 - methyl - 1,4-oxathiin (26 g., M.P. 249–251° C. dec.). The yield was 47%, based on 2,3 - dihydro - 5 - carboxy-6-methyl-1,4-oxathiin.

The following table summarizes the foregoing examples, along with additional examples. In all cases the method identified above as Method 2 was used in preparation of the product, except as noted in the first two listings of Example 1, Examples 24 and 25, Example 26 first listing, and Examples 27 and 28. In those exceptions, Method 1 was used (Method 1A in the second listing of Example 1). It will be understood that the yields given are not necessarily the optimum, and better yields are possible.

TABLE OF 2,3-DIHYDRO-5-CARBOXAMIDO-6-METHYL-1,4-OXATHIINS

| Ex. | Name of 5-Substituent | Amine | R | R' | M.P. or B.P. (° C.) | Yield (percent) |
|---|---|---|---|---|---|---|
| 1 [1] | Carboxanilido | | $C_6H_5$ | H | 93–95 | 65 |
| 1 [2] | do | | $C_6H_5$ | H | 92–93 | 75 |
| 1 [3] | do | Aniline | $C_6H_5$ | H | 93–94 | 80 |
| 2 | Carboxmorpholido | Morpholine | [4] | [4] | 2–3 mm., 168–170 | 80 |
| 3 | [5] | Ethylenediamine | [6] | [6] | 168 | |
| 4 | p-Carboxycarboxanilido | p-Aminobenzoic acid | 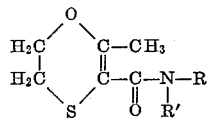 | H | 249–251 | 47 |
| 5 | N-amino carboxamido | Hydrazine | H | $NH_2$ | 190–193 | 75 |
| 6 | Carboxamido | Ammonia | H | H | 172–4 | 50 |
| 7 | N-isopropylcarboxamido | Isopropylamine | H | —CHCH$_3$ \| CH$_3$ | 117–119 | 65 |
| 8 | N-allylcarboxamido | Allylamine | H | $CH_2CH=CH_2$ | 73 | 66 |
| 9 | N-n-butyl carboxamido | n-Butylamine | H | n-$C_4H_9$ | 85–86 | 70 |
| 10 | N-isobutylcarboxamido | Isobutylamine | H | iso-$C_4H_9$ | 50–51 | 65 |
| 11 | N-dodecylcarboxamido | n-Dodecylamine | H | n-$C_{12}H_{25}$ | 72 decomp | 64 |
| 12 | N-cyclohexylcarboxamido | Cyclohexylamine | H | cyclohexyl | 127–8 | 77 |
| 13 | p-Nitrocarboxanilido | p-Nitroaniline | H | —C$_6$H$_4$—NO$_2$ | 139–140 | 25 |
| 14 | p-Ethoxycarboxanilide | p-Ethoxyaniline | H | —C$_6$H$_4$—OEt | 120–122 | 50 |
| 15 | N-benzylcarboxamido | Benzylamine | H | —C$_6$H$_4$—CH$_2$— COOH | 93 | 85 |
| 16 | Carboxyanthranilido | Anthranilic acid | H | C$_6$H$_4$(COOH) | 187–189 | 60 |

See footnotes at end of table.

TABLE—Continued

| Ex. | Name of 5-Substituent | Amine | R | R' | M.P. or B.P. (° C.) | Yield (percent) |
|---|---|---|---|---|---|---|
| 17 | Carboxfurfurylamido | Furfurylamine | H | (furyl-CH$_2$) | 103–104 | 81 |
| 18 | N-pyridyl carboxamido | Aminopyridine | H | (pyridyl) | Indef | 25 |
| 19 | N,N-di-isopropylcarboxamido | Di-isopropylamine | CH$_3$—CH—CH$_3$ | CH$_3$—CHCH$_3$ | 119, 3 mm | 64 |
| 20 | N-N-di-n-butylcarboxamido | Di-n-butylamine | n-C$_4$H$_9$ | n-C$_4$H$_9$ | 200, 12 mm | 40 |
| 21 | N-N-di-allyl carboxamido | Di-allylamine | CH$_2$—CH=CH$_2$ | CH$_2$—CH=CH$_2$ | 127, 3 mm | 80 |
| 22 | N,N-di-ethyl-carboxamido | Di-ethylamine | C$_2$H$_5$ | C$_2$H$_5$ | 132, 3 mm | 60 |
| 23 | N-methyl-N-phenylcarboxamido | N-methylaniline | CH$_3$ | C$_6$H$_5$ | 111–114 | 72 |
| 24 | p-Chlorocarboxanilido | p-Chloroaniline | H | (p-Cl-C$_6$H$_4$) | 130–132 (MeOH) | [7] 48 |
| 25 | o-Chlorocarboxanilide | o-Chloroaniline | H | (o-Cl-C$_6$H$_4$) | 83–85 (MeOH) | [7] 44 |
| 26 [1] | m-Methylcarboxanilido | m-Toluidine | H | (m-CH$_3$-C$_6$H$_4$) | 83–85 (MeOH) | [7] 46 |
| 26 [3] | | | | | | 75 |
| 27 | o-Methylcarboxanilido | o-Toluidine | H | (o-CH$_3$-C$_6$H$_4$) | 88–89 (MeOH) | [7] 81 |
| 28 | o-Methoxy carboxanilido | o-Anisidine | H | (o-OCH$_3$-C$_6$H$_4$) | 123–126 (MeOH) | [7] 45 |
| 29 | m-Chlorocarboxanilido | m-Chloroaniline | H | (m-Cl-C$_6$H$_4$) | 79–82 (MeOH) | 68 |
| 30 | p-Methylcarboxanilido | p-Toluidine | H | (p-CH$_3$-C$_6$H$_4$) | 95–89 (MeOH) | 74 |
| 31 | o-Nitrocarboxanilido | o-Nitroaniline | H | (o-NO$_2$-C$_6$H$_4$) | 129–132 (MeOH acetone) | 43 |
| 32 | m-Nitrocarboxanilido | m-Nitroaniline | H | (m-NO$_2$-C$_6$H$_4$) | Double M.P. 118–120, 123–125 (MeOH-acetone) | 60 |
| 33 | N,alpha-naphthyl-carboxamido | Alpha-naphthyl-amine | H | (α-naphthyl) | 125–127 (MeOH) | 55 |
| 34 | N-beta-naphthyl-carboxamido | Beta-naphthyl-amine | H | (β-naphthyl) | 111–113 (MeOH) | 60 |
| 35 | p-Phenylcarboxanilido | p-Amino biphenyl | H | (p-C$_6$H$_5$-C$_6$H$_4$) | 125–127 (MeOH) | 65 |
| 36 | o-Phenylcarboxanilido | o-Amino biphenyl | H | (o-C$_6$H$_5$-C$_6$H$_4$) | 83–86 (MeOH) | 57 |
| 37 | o-Carbomethoxycarboanilido | Methyl anthranilate | H | (o-COOMe-C$_6$H$_4$) | 123–125 (EtOH) | 44 |

See footnotes at end of table.

TABLE—Continued

| Ex. | Name of 5-Substituent | Amine | R | R' | M.P. or B.P. (° C.) | Yield (percent) |
|---|---|---|---|---|---|---|
| 38 | 2,4-dimethylcarboxanilido | 2,4-dimethylaniline | H | 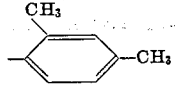 | 76–78 (EtOH) | 72 |
| 39 | m-Methoxy-carboxanilido | m-Methoxyaniline | H | 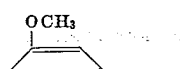 | 83–84.5 | 65 |
| 40 | o-Hydroxycarboxanilido | o-Aminophenol | H | 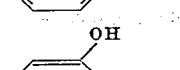 | 129–132 (EtOH) | 61 |
| 41 | m-Hydroxycarboxanilido | m-Aminophenol | H | 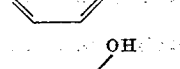 | 170–172 (EtOH) | 52 |
| 42 | N-(N',N'-dimethylamino)-carboxamido | N,N-dimethylhydrazine | H | 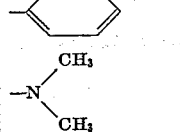 | 122–225 | 52 |
| 43 | N,β-chloroethyl-carboxamide | Ethylenimine | H | —$CH_2$—$CH_2Cl$ | 81–83 | 63 |
| 44 | N,N-ethylene carboxamido | Ethylenimine | | 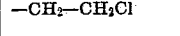 | 105 (1 mm) | 59 |
| 45 | (m-Trifluoromethyl)carboxanilido | m-Trifluoromethylaniline | H | 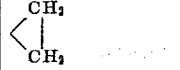 | 70–72 | 61 |
| 46 | (o-Methylthio)-carboxanilido | o-Methylthioaniline | H | 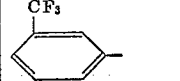 | | 71 |
| 47 | N,β-cyanoethyl-N-phenylcarboxamido | N,β-cyanoethylaniline | $CH_2CH_2CN$ | 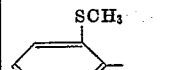 | 87–89 | 60 |
| 48 | N-2-benzothiazolylcarboxamido | 2-amino-benzothiazole | H | 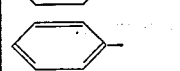 | 153–154 | 80 |
| 49 | N-t-butylcarboxamido | t-Butylamine | H | $(CH_3)_3C$— | 48–51 | 78 |
| 50 | N-n-pentylcarboxamido | n-Pentylamine | H | $C_5H_{11}$ | 80–82 | 75 |
| 51 | N-n-hexylcarboxamido | n-Hexylamine | H | $C_6H_{13}$ | 82–84 | 71 |
| 52 | N-n-octylcarboxamido | n-Octylamine | H | $C_8H_{17}$ | 74–75 | 84 |
| 53 | N-n-decylcarboxamido | n-Decylamine | H | $C_{10}H_{21}$ | 46–47 | 88 |
| 54 | N-n-hexadecylcarboxamido | n-Hexadecylamine | H | $C_{16}H_{33}$ | 74–75 | 66 |
| 55 | N-n-octadecylcarboxamido | n-Octadecylamine | H | $C_{18}H_{37}$ | 79–80 | 74 |
| 56 | o-Ethylcarboxanilido | o-Ethylaniline | H | o-$C_2H_5C_6H_4$— | 78–80 | 82 |
| 57 | m-Bromocarboxanilido | m-Bromoaniline | H | m-$BrC_6H_4$— | 92–93 | 61 |
| 58 | p-Bromocarboxanilido | p-Bromoaniline | H | p-$BrC_6H_4$— | 119–120 | 86 |
| 59 | p-Carbethoxycarboxanilido | p-Carbethoxyaniline | H | p-$C_2H_5OOCC_6H_4$— | 90–92 | 63 |
| 60 | o-Carboxamido carboxanilido | o-Carboxamidoaniline | H | o-$H_2NCOC_6H_4$— | 186–188 | 57 |
| 61 | m-Acetylcarboxanilido | m-Acetylaniline | H | m-$CH_3COC_6H_4$— | 117.5–119.5 | 68 |
| 62 | 2,3-dimethylcarboxanilido | 2,3-dimethylaniline | H | 2,3-$(CH_3)_2C_6H_3$ | 101.5–103.5 | 77 |
| 63 | 2,6-diethylcarboxanilido | 2,6-diethylaniline | H | 2,6-$(C_2H_5)C_6H_3$ | 81–83 | 58 |
| 64 | 2-methyl-3-chlorocarboxanilido | 2-methyl-3-chloroaniline | H | 2-$CH_3$-3-Cl-$C_6H_3$— | 136–138 | 64 |
| 65 | 2,5-dichlorocarboxanilido | 2,5-dichloroaniline | H | 2,5-$Cl_2C_6H_3$ | 120–122 | 56 |
| 66 | 2,3-dichlorocarboxanilido | 2,3-dichloroaniline | H | 2,3-$Cl_2C_6H_3$— | 105–107 | 81 |
| 67 | 3,4-dichlorocarboxanilido | 3,4-dichloroaniline | H | 3,4-$Cl_2C_6H_3$— | 106–108 | 59 |

See footnotes at end of table.

TABLE—Continued

| Ex. | Name of 5-Substituent | Amine | R | R' | M.P. or B.P. (° C.) | Yield (percent) |
|---|---|---|---|---|---|---|
| 68 | 3,5-dichlorocarboxanilido | 3,5-dichloroaniline | H | 3,5-$Cl_2C_6H_3$— | 147–149 | 76 |
| 69 | 2-chloro-6-methylcarboxanilido | 2-chloro-6-methylaniline | H | 2-Cl-6-$CH_3C_6H_3$— | 82–84 | 57 |
| 70 | 2,4,5-trichlorocarboxanilido | 2,4,5-trichloroaniline | H | 2,4,5-$Cl_3C_6H_2$ | 166–168 | 70 |
| 71 | o-Methyl-N-ethylcarboxanilido | o-Methyl-N-ethylaniline | $C_2H_5$ | o-$CH_3C_6H_4$ | 57.5–60 | 49 |

[1] Method 1.
[2] Method 1A.
[3] Method 2.
[4] R and R' together =

$$\begin{array}{c} CH_2-CH_2 \\ / \quad \quad \backslash \\ \quad \quad \quad O \\ \backslash \quad \quad / \\ CH_2-CH_2 \end{array}$$

[5]
$$\left[ \begin{array}{c} H_2C \diagup ^O \diagdown C-CH_3 \\ | \quad \quad \quad \| \\ H_2C \diagdown _S \diagup C-C-N-CH_2- \\ \quad \quad \quad \| \; \; | \\ \quad \quad \quad O \; H \end{array} \right]_2$$

[6] R = H, R' =
$$\begin{array}{c} \quad \quad \quad O \\ \quad \quad \quad \diagup \; \diagdown \\ \quad \quad \quad CH_3-C \quad CH_2 \\ \quad \quad \quad \quad | \; \quad | \\ CH_2-CH_2-N-C-C \quad CH_2 \\ \quad \quad \quad \quad | \; \| \; \diagdown \; \diagup \\ \quad \quad \quad \quad H \; O \quad S \end{array}$$

[7] The yields are based on alpha-chloro-N-substituted acetoacetamides.

The intermediate chemical XII used in the method of preparation identified as Method 2 above, namely, 2,3-dihydro-6-methyl-1,4-oxathiin-5-carboxylic acid, is believed to be a new chemical, and is in itself a useful article of commerce.

Having thus described our invention, what we claim and desire to protect by Letters Patent is:

1. A chemical of the formula $$\begin{array}{c} H_2C \diagup ^O \diagdown C-CH_3 \\ | \quad \quad \quad \| \\ H_2C \diagdown _S \diagup C-X \end{array}$$

wherein X is a carboxamido group, with the further proviso that when either R or R' is one of the moieties furfuryl, pyridyl or 2-benzothiazolyl, the other is not one of said moieties having the formula $$\begin{array}{c} -C-N-R' \\ \| \; | \\ O \; R \end{array}$$

wherein R and R' are the same or different and are selected from the group consisting of hydrogen, phenyl, alkyl having up to 12 carbon atoms, allyl, cyclohexyl, nitrophenyl, alkoxyphenyl in which the alkoxy group has up to two carbon atoms, benzyl, carboxyphenyl, furfuryl, pyridyl, halophenyl, tolyl, naphthyl, biphenyl, hydroxyphenyl, amino, dimethylamino, methylthiophenyl, 2-benzothiazolyl, and R and R' may be linked together to form a morpholido group.

2. A method of making a 2,3-dihydro-5-N-aryl-carboxamino-6-methyl-1,4-oxathiin comprising mixing an alpha-chloro-N-arylacetoacetamide with 2-mercaptoethanol in a mutual solvent in the presence of a base, and thereafter subjecting the resulting product to acidic conditions whereby it cyclizes with loss of water to form 2,3-dihydro-5-N-arylcarboxamido-5-methyl-1,4-oxathiin, and subsequently isolating the said oxathiin from the reaction mixture.

3. A method of making a 2,3-dihydro-5-N,N-dialkyl carboxamido-6-methyl-1,4-oxathiin comprising mixing ethyl alpha-chloroacetoacetate with 2-mercaptoethanol in a mutual solvent in the presence of a base, and thereafter subjecting the resulting product to acidic conditions whereby it cyclizes with loss of water to form the ethyl ester of 2,3-dihydro-5-carboxylic acid-6-methyl-1,4-oxathiin, boiling the resulting ester with aqueous alkali to hydrolyze it to the corresponding acid, adding thionyl chloride to convert the acid to the acid chloride, adding a dialkyl amine, and thereafter recovering the resulting 2,3-dihydro-5-N,N-dialkyl carboxamido-6-methyl-1,4-oxathiin.

4. A chemical of the formula $$\begin{array}{c} H_2C \diagup ^O \diagdown C-CH_3 \\ | \quad \quad \quad \| \\ H_2C \diagdown _S \diagup C-C-N-R' \\ \quad \quad \quad \| \; | \\ \quad \quad \quad O \; H \end{array}$$

wherein R' is a hydrocarbon group having up to 12 carbon atoms selected from the group consisting of alkyl, aryl, alkaryl and cycloalkyl.

5. 2,3 - dihydro - 5 - carboxanilido - 6 - methyl - 1,4-oxathiin.

6. A 2,3 - dihydro - 5 - N - tolylcarboxamido - 6-methyl-1,4-oxathiin.

7. 2,3 - dihydro - 5 - N - (o-tolyl)carboxamido - 6-methyl-1,4-oxathiin.

8. 2,3 - dihydro - 5 - N - (m-tolyl)carboxamido - 6-methyl-1,4-oxathiin.

9. 2,3 - dihydro - 5 - N - butylcarboxamide - 6-methyl-1,4-oxathiin.

10. 2,3 - dihydro - 5 - N -cyclohexylcarboxamido - 6-methyl-1,4-oxathiin.

11. A 2,3 - dihydro - 5 - N - arylcarboxamido - 6-methyl-1,4-oxathiin.

12. A 2,3-dihydro-5-N-alkylcarboxamido-6-methyl-1, 4-oxathiin.

13. A 2,3 - dihydro - 5 - N - cycloalkylcarboxamido-6-methyl-1,4-oxathiin.

14. 2,3 - dihydro - 5-N-(2,4-dimethylphenyl)carboxamido-6-methyl-1,4-oxathiin.

15. 2,3 - dihydro - 5 - N-(m-methoxyphenyl)carboxamido-6-methyl-1,4-oxathiin.

16. A method of making a 2,3-dihydro-5-N-substituted carboxamido-6-methyl-1,4-oxathiin comprising mixing an alpha-chloro-N-substituted acetoacetamide with 2-mercaptoethanol in a mutual solvent in the presence of a base, and thereafter subjecting the resulting product to acidic conditions whereby it cyclizes with loss of water to form 2,3 - dihydro - 5-N-substituted carboxamido-6-methyl-1,4-oxathiin, and subsequently isolating the said oxathiin from the resulting mixture.

17. A method of making an oxathiin of the formula $$\begin{array}{c} H_2C \diagup ^O \diagdown C-CH_3 \\ | \quad \quad \quad \| \\ H_2C \diagdown _S \diagup C-C-N-R' \\ \quad \quad \quad \| \; | \\ \quad \quad \quad O \; H \end{array}$$

wherein R' is a group having up to 15 carbon atoms selected from the group consisting of alkyl, aryl and cycloalkyl, comprising mixing an alpha-chloro-N-substituted acetoacetamide, wherein the said R is the N-substituent, with 2-mercaptoethanol in a mutual solvent in the presence of a base, and thereafter subjecting the resulting product to acidic conditions whereby it cyclizes with loss of water to form said oxathiin, and subsequently isolating the said oxathiin from the resulting mixture.

18. A method of making a chemical of the formula

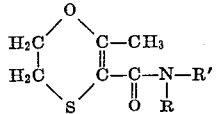

comprising mixing ethyl alpha-chloroacetoacetate with 2-mercaptoethanol in a mutual solvent in the presence of a base, and thereafter subjecting the resulting product to acidic conditions whereby it cyclizes with loss of water to form the ethyl ester of 2,3-dihydro-6-methyl-1,4-oxathiin-5-carboxylic acid, boiling the resulting ester with aqueous alkali to hydrolyze it to the corresponding acid, adding thionyl chloride to convert the acid to acid chloride, adding an amine of the formula

NHRR' wherein R and R' are selected from the group consisting of hydrogen, NH$_2$, alkyl, aryl, and cycloalkyl and thereafter recovering the resulting chemical of the first said formula.

19. 2,3-dihydro-6-methyl-1,4-oxathiin-5-carboxylic acid.

References Cited
UNITED STATES PATENTS

| | | | |
|---|---|---|---|
| 2,338,516 | 1/1944 | Kern et al. | 260—327 |
| 2,991,292 | 7/1961 | Degener et al. | 260—327 |

JAMES A. PATTEN, *Primary Examiner*.

UNITED STATES PATENT OFFICE
CERTIFICATE OF CORRECTION

Patent No. 3,393,202                                July 16, 1968

Marshall Kulka et al.

It is certified that error appears in the above identified patent and that said Letters Patent are hereby corrected as shown below:

Column 13, line 61, "5-methyl" should read -- 6-methyl --.
Column 14, line 43, "butylcarboxamide" should read -- butylcarboxamido --.

Signed and sealed this 30th day of December 1969.

(SEAL)
Attest:

Edward M. Fletcher, Jr.
Attesting Officer

WILLIAM E. SCHUYLER, JR.
Commissioner of Patents